March 30, 1954   J. D. RAHM ET AL   2,673,783
FISHING TACKLE BOX
Filed April 10, 1950   2 Sheets-Sheet 2

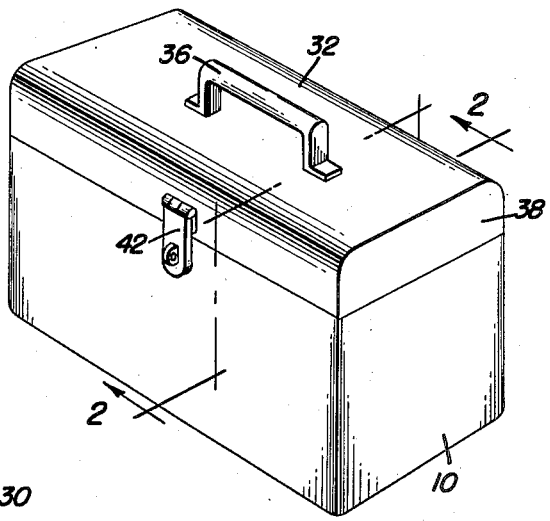
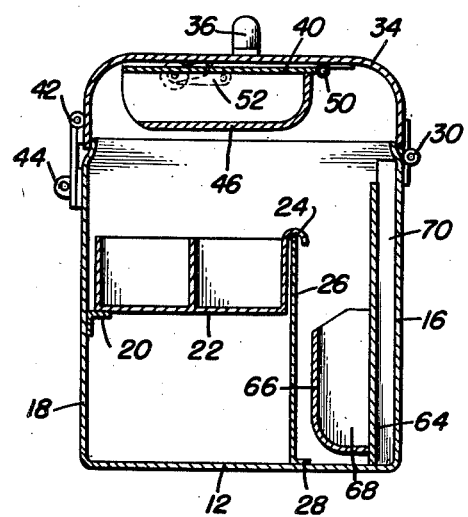
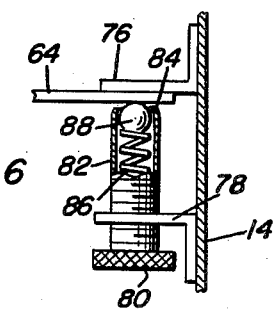
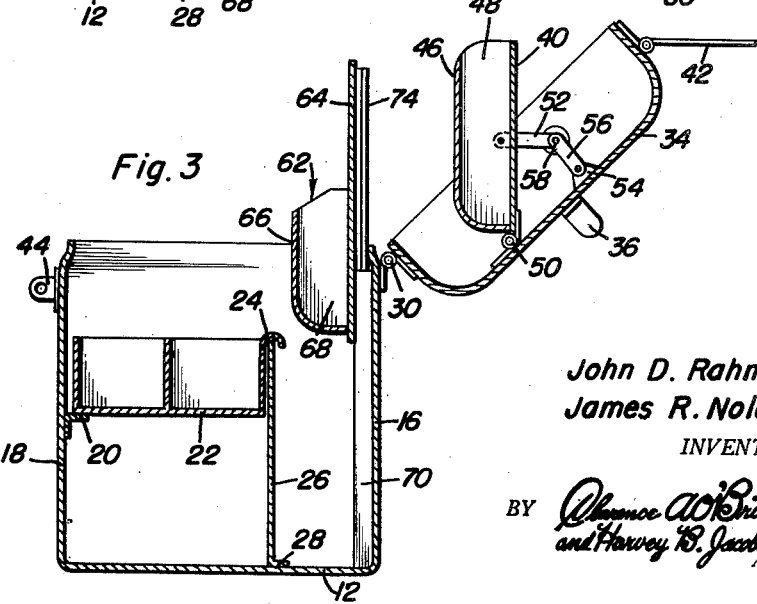
John D. Rahm
James R. Noland
INVENTORS

John D. Rahm
James R. Noland
INVENTORS

Patented Mar. 30, 1954

2,673,783

UNITED STATES PATENT OFFICE 2,673,783

FISHING TACKLE BOX

John D. Rahm, Kosmosdale, and James R. Noland, Owensboro, Ky.

Application April 10, 1950, Serial No. 154,972

1 Claim. (Cl. 312—312)

This invention relates to a box for retaining fishing tackle and has for its primary object to permit the storage of many lures, flys, lines, sinkers, bobs and so forth within a relatively small container.

An important object of the invention is to provide a fishing tackle box having trays including pockets for retaining lures in such a manner that the lures are always visible when the box is opened, the trays including means for raising and positioning them in the box in such a manner that ready access may be had to the lures in the pockets without injury to the hands.

A further object of the invention is to provide a box of the character described which is relatively simple in design and construction, inexpensive, capable of storing many fishing tackle items, and very easy to manipulate to remove said items.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the box;

Figure 2 is a sectional view taken on the line 2—2 of Figure 1;

Figure 3 is a view similar to Figure 2 and illustrating the open position of the box;

Figure 6 is a fragmentary enlarged sectional view of a detail of construction.

Specific reference is now made to the drawings. In the several views in the accompanying drawings and in the following specification reference characters indicate corresponding elements throughout.

Figure 4:
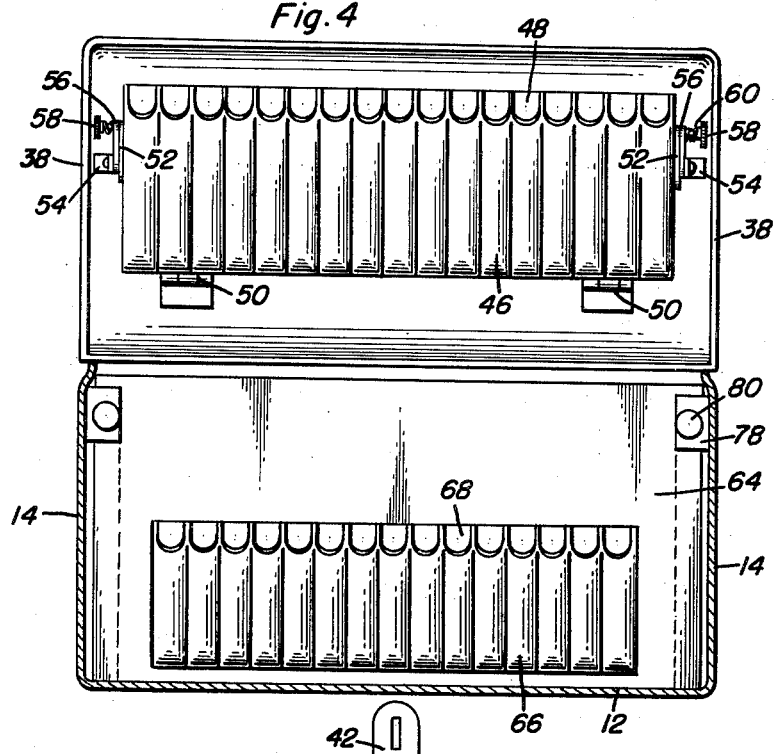
Figure 4 is a front elevational view looking to the right on Figure 3, the container being shown in section.
Figure 5:
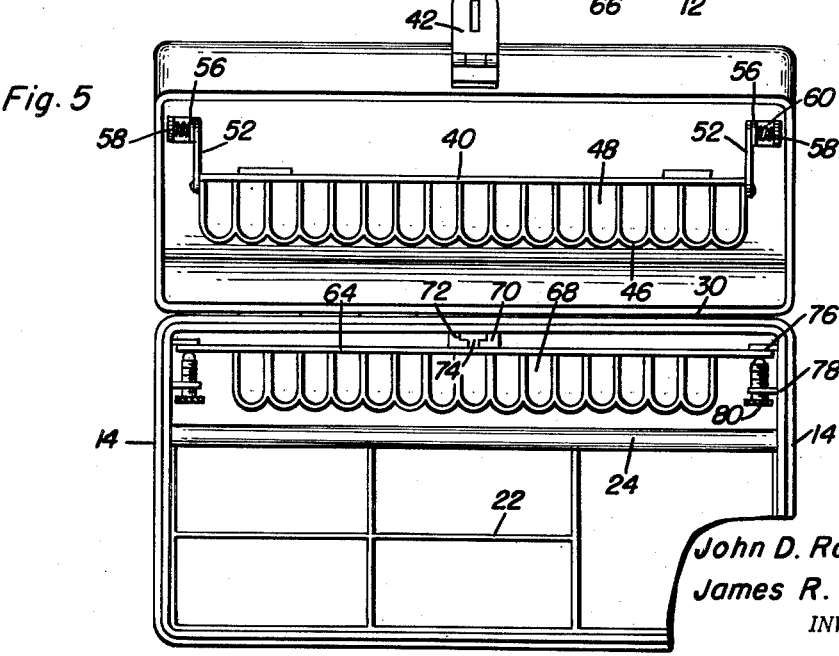
Figure 5 is a plan view of the box looking thereinto when the lid is open.

The present box may be fabricated of suitable metals, such as aluminum, and includes a substantially rectangular container 10 having a base 12, side walls 14, a rear wall 16 and a front wall 18. Secured to the inner surface of the front wall is an angle bracket 20 serving as a ledge for removably supporting a tray 22 which is provided with a curved, elongated lip 24 that rests on the upper free edge of a vertically extending bracket or plate 26 secured as at 28 to the base 12.

Hinged as at 30 to the rear wall 16 is a lid 32 having an arcuate top wall 34 to which is secured a suitable handle 36 and side walls 38. Accordingly, the lid has depth sufficient to enclose a lure-retaining tray 40. The lid also includes a pivoted hasp 42 adapted to engage a keeper 44 on the front wall 18 of the container in which keeper may be secured a suitable lock (not shown). The tray 40 includes a plurality of interconnected arcuate plates 46, preferably fabricated of aluminum, forming open-ended, substantially U-shaped, lure-receiving pockets 48. The tray 40 is pivoted as at 50 to the inner surface of the top wall 34 of the lid.

Pivoted to the sides of the tray 40 is a pair of links 52. Pivoted to ears 54 on the inner surface of the wall 34 is a further pair of links 56. Pivotally interconnecting the free ends of the links 52 and 56 are headed screws 58 about which are wound coil springs 60 so that turning of the screws 58 will tension springs 60 and cause frictional engagement of the links 52 and 56 to retain the tray 40 in a desired fixed vertical position relative to the lid when opened as shown in Figure 3.

A further tray 62 is provided having a plate 64 to which is secured interconnected arcuate plates 66 forming U-shaped open-ended line-receiving pockets 68, the tray 62 being similar in construction and design to the tray 40. Secured centrally to the rear wall 16 of the container 10 is a vertical block 70 having a vertical T-shaped slot 72. Secured centrally to the plate 64 is a T-shaped bar 74 slidably received in the slot so that the tray 62 may be raised in the container as shown clearly in Figure 3. To retain the tray 62 and plate 64 in a desired raised position, the following means is provided. A pair of vertical angle brackets 76 are secured to the side walls 14 behind the plates 64. Secured to the side walls 14 in front of the plates 64 is a further pair of angle brackets 78, and threaded through the brackets 78 are headed screws 80, each including a tubular portion 82 having an inwardly bent free edge 84. Received in the tubular portion is a spring 86 and a ball 88 supported on the spring and retained with the tubular portion by the inwardly bent edge 84. Turning of the screws 80 will adjustably urge the balls 88 against the plate 64 which will in turn frictionally engage the angles 76.

In use, lures may be placed in the pockets 48 and 68 and other tackle may be placed in the container as well as in the tray 22. When the lid is opened, the tray 40 may be held in proper position to remove lures by means of the adjusting screws 58. The tray 62 may then be slid upwardly in the container and retained in a desired position to remove lures from the pockets 68 by means of the adjusting screws 80.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having desrribed the invention, what is claimed as new is:

A fishing tackle box comprising a substantially rectangular container, a tray having fish-lure receiving pockets, means for slidably securing said tray to one wall of said container, and means for adjustably retaining said tray in a raised position, said first named means including said one wall of said container having a vertical T-slot therein, and a plate securing said tray and including a vertical T-shaped block slidably received in said slot, said last named means including vertical angle brackets secured to said one wall and loosely abutting said plate, and adjustable resilient means for urging said plate into frictional engagement with said angle brackets, said adjustable resilient means including angle brackets secured to the side walls of said container, headed screws threaded through said second named angle brackets, and spring urged balls carried by said screws and adapted to bear on said plate and urge it against said first named angle brackets.

JOHN D. RAHM.
JAMES R. NOLAND.

References Cited in the file of this patent
UNITED STATES PATENTS

| Number | Name | Date |
|---|---|---|
| 173,548 | Large | Feb. 15, 1876 |
| 214,568 | Hoyt | Apr. 22, 1879 |
| 899,466 | O'Leary | Sept. 22, 1908 |
| 1,201,111 | Tanner | Oct. 10, 1916 |
| 1,383,582 | Stubbs | July 5, 1921 |
| 1,679,244 | Fitzgerald | July 31, 1928 |
| 1,888,304 | Beakeart | Nov. 22, 1932 |
| 1,987,448 | Pearson | Jan. 8, 1935 |
| 2,242,720 | Froelich | May 20, 1941 |
| 2,316,632 | Smart | Apr. 13, 1943 |
| 2,422,114 | Matter | June 10, 1947 |
| 2,501,879 | Sulentic | Mar. 28, 1950 |

FOREIGN PATENTS

| Number | Country | Date |
|---|---|---|
| 172,314 | Switzerland | Dec. 17, 1934 |